United States Patent
Bruno et al.

(10) Patent No.: US 9,926,080 B2
(45) Date of Patent: Mar. 27, 2018

(54) ENVIRONMENTAL CONTROL SYSTEM UTILIZING PARALLEL RAM HEAT EXCHANGERS WITH AIR CYCLE MACHINE SPEED COMPENSATION

(71) Applicant: Hamilton Sundstrand Corporation, Windsor Locks, CT (US)

(72) Inventors: Louis J. Bruno, Ellington, CT (US); Thomas M. Zywiak, Suffield, CT (US); Harold W. Hipsky, Willington, CT (US); Christina W. Millot, Wilbraham, MA (US); Donald E. Army, Jr., Enfield, CT (US); Paul M. D'Orlando, Simsbury, CT (US); Erin G. Kline, Vernon, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 401 days.

(21) Appl. No.: 14/619,646

(22) Filed: Feb. 11, 2015

(65) Prior Publication Data
US 2016/0229541 A1   Aug. 11, 2016

(51) Int. Cl.
*B60H 1/32* (2006.01)
*B64D 13/06* (2006.01)
*F02C 6/08* (2006.01)
*B64D 13/08* (2006.01)

(52) U.S. Cl.
CPC .............. *B64D 13/06* (2013.01); *B64D 13/08* (2013.01); *F02C 6/08* (2013.01); *B64D 2013/0603* (2013.01); *B64D 2013/0618* (2013.01); *B64D 2013/0648* (2013.01); *Y02T 50/56* (2013.01)

(58) Field of Classification Search
CPC ............... B64D 13/06; B64D 13/08; B64D 2013/0603; B64D 2013/0618; B64D 2013/0648; F02C 6/08
See application file for complete search history.

(56) References Cited

U.S. PATENT DOCUMENTS 6,257,003 B1 * 7/2001 Hipsky ............... B64D 13/06
                                                    62/402
2004/0177639 A1   9/2004 Army, Jr. et al.
2008/0242209 A1  10/2008 Steinmaier et al.

FOREIGN PATENT DOCUMENTS

DE   10301465 A1   8/2004
GB   2398864 A     9/2004

OTHER PUBLICATIONS

EPSR for EP Application No. 16155243.5, dated Jul. 8, 2016, 5 pages.

* cited by examiner

*Primary Examiner* — Elizabeth Martin
(74) *Attorney, Agent, or Firm* — Cantor Colburn LLP

(57) ABSTRACT

A system, which includes a plurality of heat exchangers and a compressing device, is configured to prepare in parallel a medium bled from a low-pressure location of an engine and flowing through a plurality of heat exchangers into a chamber. The compressing device is in communication with the plurality of heat exchangers and regulates a pressure of the medium flowing through the plurality of heat exchangers. The compressing device is bypassed based on the preparing in parallel the medium for the chamber, which in turn enables the compressing device to windmill. Therefore, the system employs at least one mechanism to prevent components of the compressing device from windmilling.

14 Claims, 9 Drawing Sheets

ENVIRONMENTAL CONTROL SYSTEM UTILIZING PARALLEL RAM HEAT EXCHANGERS WITH AIR CYCLE MACHINE SPEED COMPENSATION

BACKGROUND OF THE INVENTION

In general, with respect to present air conditioning systems of aircraft, cabin pressurization and cooling is powered by engine bleed pressures at cruise. For example, pressurized air from an engine of the aircraft is provided to a cabin through a series of systems that alter the temperatures and pressures of the pressurized air. To power this preparation of the pressurized air, the only source of energy is the pressure of the air itself. As a result, the present air conditioning systems have always required relatively high pressures at cruise. Unfortunately, in view of an overarching trend in the aerospace industry towards more efficient aircraft, the relatively high pressures provide limited efficiency with respect to engine fuel burn.

BRIEF DESCRIPTION OF THE INVENTION

According to one embodiment, a system comprises a medium flowing from a low-pressure location of an engine to a chamber; a plurality of heat exchangers configured to provide parallel cooling by receiving the medium in parallel across at least a first heat exchanger and a second heat exchanger of the plurality of heat exchangers; and a compressing device, in communication with the plurality of heat exchangers, configured to be bypassed during the parallel cooling; and a mechanism for preventing the compressing device from windmilling during the parallel cooling.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION OF THE INVENTION

A detailed description of one or more embodiments of the disclosed apparatus and method are presented herein by way of exemplification and not limitation with reference to the Figures.

As indicated above, the relatively high pressures provide limited efficiency with respect to engine fuel burn. Thus, what is needed is an environmental control system that provides a medium in parallel across a plurality of heat exchangers to, thus, provide cabin pressurization and cooling at a high engine fuel burn efficiency while preventing components of that system from windmilling.

In general, embodiments of the present invention disclosed herein may include a system comprising a plurality of heat exchangers and a medium flowing through the plurality of heat exchangers, wherein the medium is bled from a low-pressure location of an engine through the plurality of heat exchangers in parallel into a chamber. The low-pressure location of the engine provides the medium at an initial pressure level near a pressure of the medium once it is in the chamber (e.g., chamber pressure). In contrast, conventional systems utilize an initial pressure level that is much greater than the pressure chamber. For example, if a desired chamber pressure is 5 psia, conventional systems will bleed air from a higher pressure location of the engine that provides an initial pressure level at three times the chamber pressure (e.g., 15 psia). Further, the pressure of the medium at the low-pressure location may be slightly above or slightly below the chamber pressure (e.g., any value along the range of 4 to 7 psia when the chamber pressure is 5 psia).

Bleeding the medium at such a low pressure from the low-pressure location causes less of a fuel burn than bleeding air from a higher pressure location. Yet, because the medium is starting at this relatively low initial pressure level and because a drop in pressure occurs over the plurality of heat exchangers, the medium will drop below the chamber pressure while the medium is flowing through the plurality of heat exchangers in series. When the pressure of the medium is below the pressure of the chamber the medium will not flow into the chamber to provide, for example, pressurization and temperature conditioning. Thus, the system splits a flow of the medium into pieces so that the medium can go into at least two heat exchangers in parallel to reduce the total pressure drop of the medium across the at least two heat exchangers (e.g., parallel cooling provides a minimum pressure drop). With the minimum pressure, the system can connect and bleed from the low-pressure location. Note that because a temperature of the medium bled from the low-pressure location is significantly lower than a temperature of the medium bled from the high-pressure location, the system requires less energy to reduce the medium as the medium flows in parallel over the at least two heat exchangers.

Figure 1:
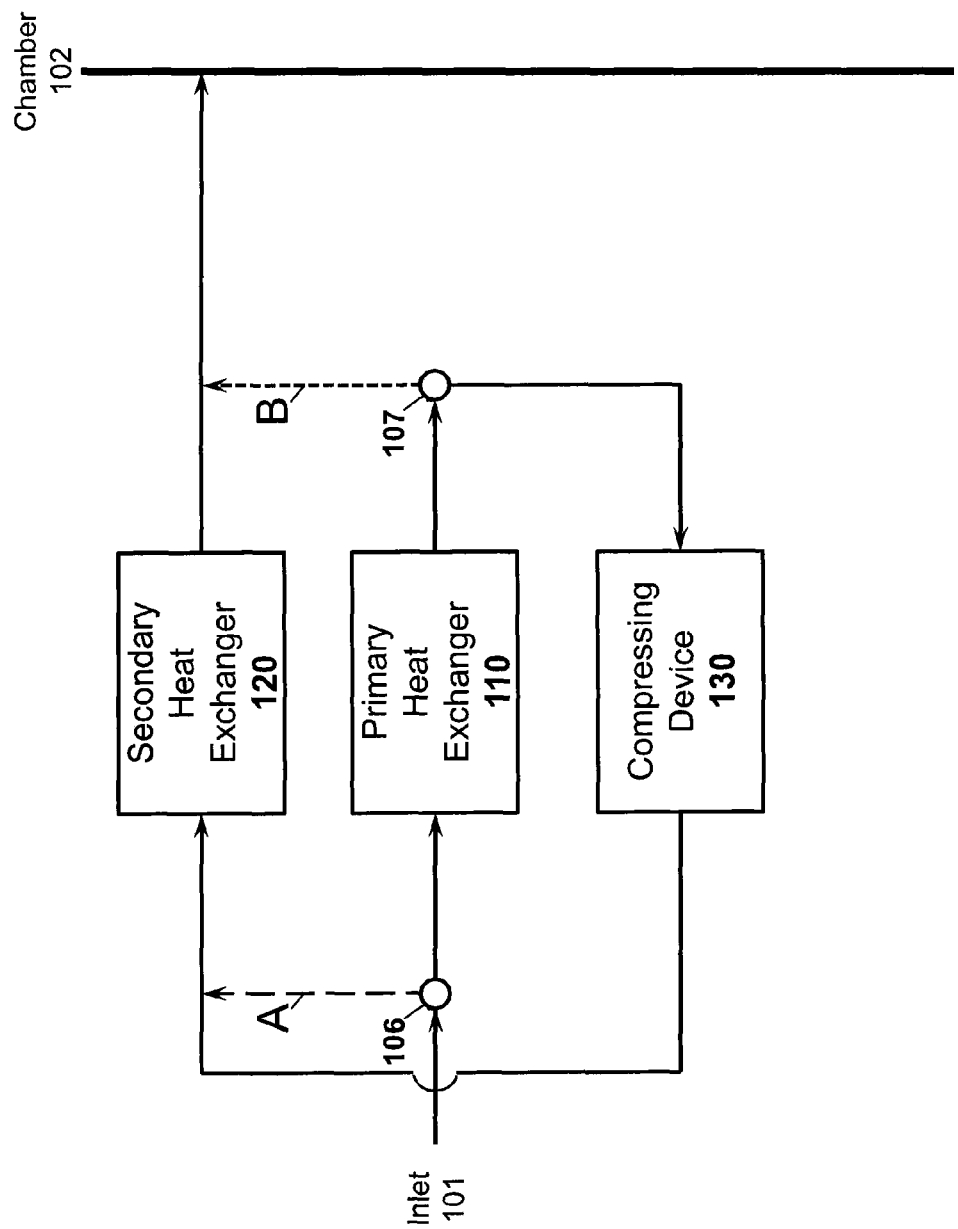
FIG. 1 is a diagram of an schematic of an environmental control system according to an embodiment.

FIG. 1 illustrates a system 100 with a medium (e.g., air) flowing from an inlet 101 to a chamber 102 though valves 105, 106, a primary heat exchanger 110, a secondary heat exchanger 120, and a compressing device 130.

In general, the system 100 supplies a medium to any environment (e.g., chamber 102), thereby providing regulation and/or monitoring of that environment. In one embodiment, the system 100 is any environmental control system of a vehicle, such as an aircraft, that provides air supply, thermal control, and cabin pressurization for a crew and passengers of the aircraft. Environmental control systems may also include avionics cooling, smoke detection, and/or fire suppression. Further, with respect to the aircraft example, the system 100 supplies pressurized air (e.g., a medium) to a flight deck of the aircraft (e.g., the chamber 102), for both comfort and pressurization. The air is supplied to the system 100 at inlet 101 by being "bled" from a compressor stage of an aircraft engine and/or directly from exterior air (e.g., via a ram air system). The temperature and pressure of this "bleed air" varies widely depending upon which compressor stage and a revolutions per minute of the aircraft engine. To achieve the desired temperature, the bleed air is cooled as it is passed through the heat exchangers 110, 120. To achieve the desired pressure, the bleed air is compressed as it is passed through the device 130. Note that the interaction of the system 100 with the aircraft engine influences how much fuel burn by the aircraft engine is needed to perform operations, such as supplying pressurized air, related to that interaction.

Valves, such as valves 105, 106, are devices that regulate, direct, and/or control a flow of a medium (e.g., gases, liquids, fluidized solids, or slurries, such as bleed air) by opening, closing, or partially obstructing various passageways within the tubes, pipes, etc. of the system 100. Valves may be operated by actuators such that the flow rates of any medium in any portion of the system 100 may be regulated to a desired value. For example, the valve 105 enables a flow of the medium from inlet 101 to be divided across the primary heat exchanger 110 and the secondary heat exchanger 120. Further, the valve 106 enables a flow of the medium from the primary heat exchanger 110 to be sent to the compressing device 130 and/or chamber 102.

Heat exchangers (e.g., the primary heat exchanger 110 and the secondary heat exchanger 120) are equipment built for efficient heat transfer from one medium to another. Examples of heat exchangers include double pipe, shell and tube, plate, plate and shell, adiabatic wheel, plate fin, pillow plate, and fluid heat exchangers. Continuing with the aircraft example above, air forced by a fan (e.g., via push or pull methods) and/or rammed during flight is blown across the heat exchanger at a variable cooling airflow to control the final air temperature of the bleed air.

The compressing device 130 (e.g., an air cycle machine as described below) is a mechanical device that regulates a pressure of a medium (e.g., increasing the pressure of a gas). Examples of a compressor include centrifugal, diagonal or mixed-flow, axial-flow, reciprocating, ionic liquid piston, rotary screw, rotary vane, scroll, diaphragm, air bubble compressors. Further, compressors are typically driven by an electric motor or a steam or a gas turbine.

In one operation, the system 100 can bypass the compressing device 130 by activating the valve 106 to divide the flow of the medium from inlet 101 into the primary heat exchanger 110 and the secondary heat exchanger 120 (e.g., arrow A). Both heat exchangers, in turn, cool their respective portions of the medium. Then, the flow of the medium exiting out of the secondary heat exchanger 120 is combined through the activation of valve 106 with flow of the medium exiting out of the primary heat exchanger 110 (e.g., arrow B). This operation may be called a heat exchanger cooling mode that lowers the pressure of the medium near that of the chamber pressure.

Figure 2:
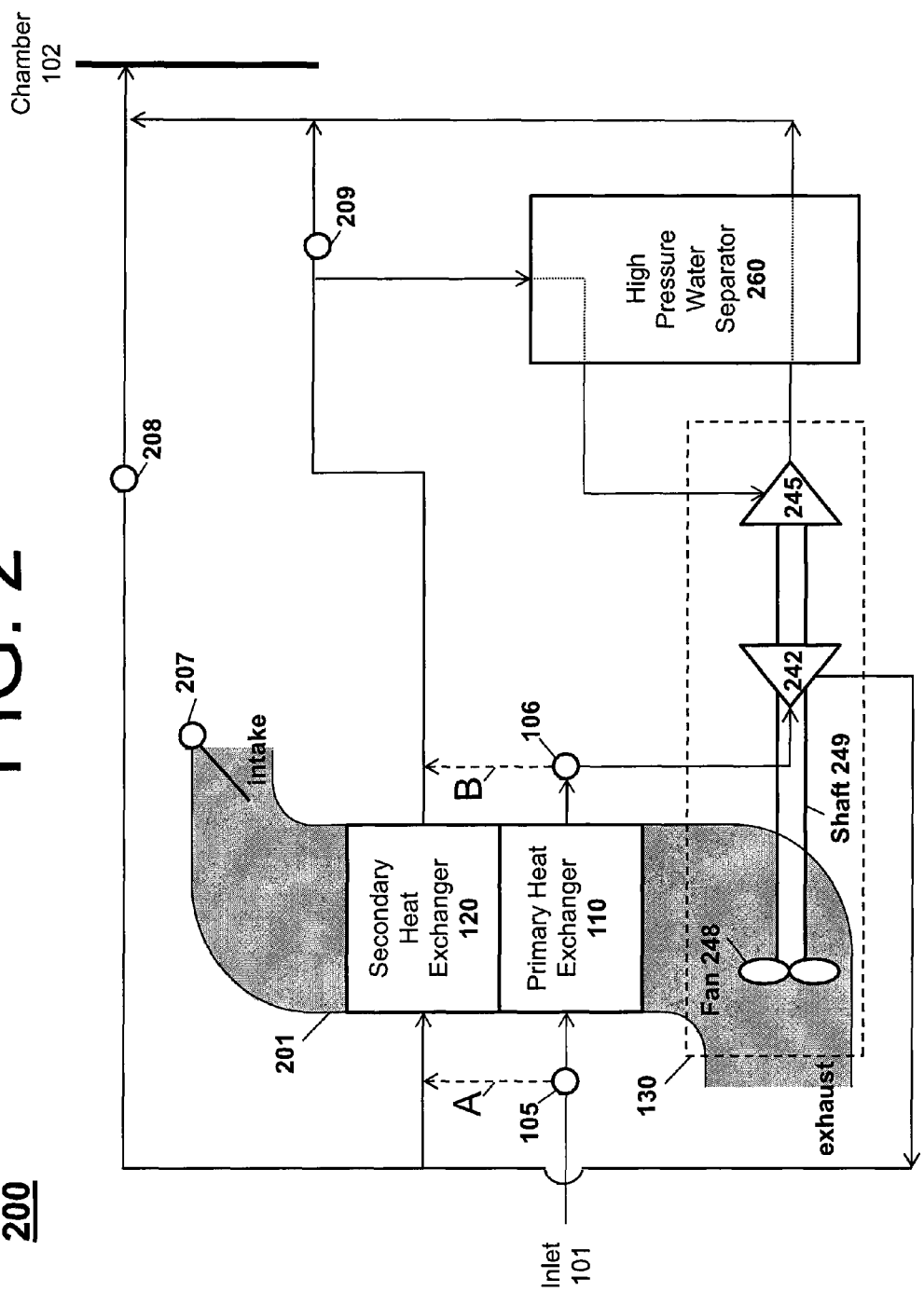
FIG. 2 is operation example of an environmental control system according to an embodiment.

The system 100 of FIG. 1 will now be described with reference to FIG. 2, in view of the aircraft example above. FIG. 2 illustrates an environmental control system 200 (e.g., an embodiment of system 100) that includes, in additional to the previously described items of FIG. 1, a shell 201, valves 207, 208, 209, the compressing device 130 (that includes a compressor 242, a turbine 245, a fan 248, and a shaft 249), and a high pressure water separator 260, each of which are connected via tubes, pipes, ducts and the like, such that bleed air is accepted at the inlet 101 (e.g., high- or low-pressure location of an engine of an aircraft) and provided to the chamber 102 (e.g., cabin, flight deck, etc.).

The environmental control system 200 is an example of an environmental control system of an aircraft that provides air supply, thermal control, and cabin pressurization for the crew and passengers of the aircraft. The shell 201 is an example of a ram chamber of a ram system which uses dynamic air pressure created by an aircraft in motion to increase a static air pressure inside of the shell. Valves 207, 208, 209 are examples of valves described above.

The compressing device 130 can be an air cycle machine that regulates a pressure of a medium (e.g., increasing the pressure of a bleed air). The turbine 245 is a mechanical device that drives the compressor 242 and fan 248 via the shaft 249. The compressor 242 is a mechanical device that compresses the bleed air received from a first heat exchanger (e.g., the primary heat exchanger 110). The fan 248 is a mechanical device that forces via push or pull methods air through the shell 201 across the heat exchangers at a variable cooling airflow. The compressor 242, the turbine 245, and the fan 248 together regulate pressure and illustrate, for example, that the air cycle machine (e.g., the compressing device 130) may operate as a three-wheel air cycle machine. In turn, the three-wheel air cycle machine may include addition of components, such as a power turbine that utilizes exhaust from the chamber 102 to provide additional power to the compressing device 130.

The high pressure water separator 260 is a mechanical device that performs operation of a heat exchanger described above and/or a process of removing water from the bleed air, either temporarily or permanently.

In one operation, bleed air is accepted at inlet 101 from a high-pressure location of an engine of an aircraft at an initial flow rate, pressure (e.g., 35 psia), and temperature that is much greater a final flow rate, pressure (e.g., 12 psia), and temperature. The bleed air is fed through the primary heat exchanger 110, which through cooling lowers the temperature to the compressor 242, which then raises the pressure. Then, due to the valves 208, 209 being closed the bleed air is fed through the secondary heat exchanger 120, which also through cooling lowers the temperature to the high pressure water separator 260. Note that in this operation, the bleed air is fed in series through the primary heat exchanger 110 then the secondary heat exchanger 120.

Figure 3:
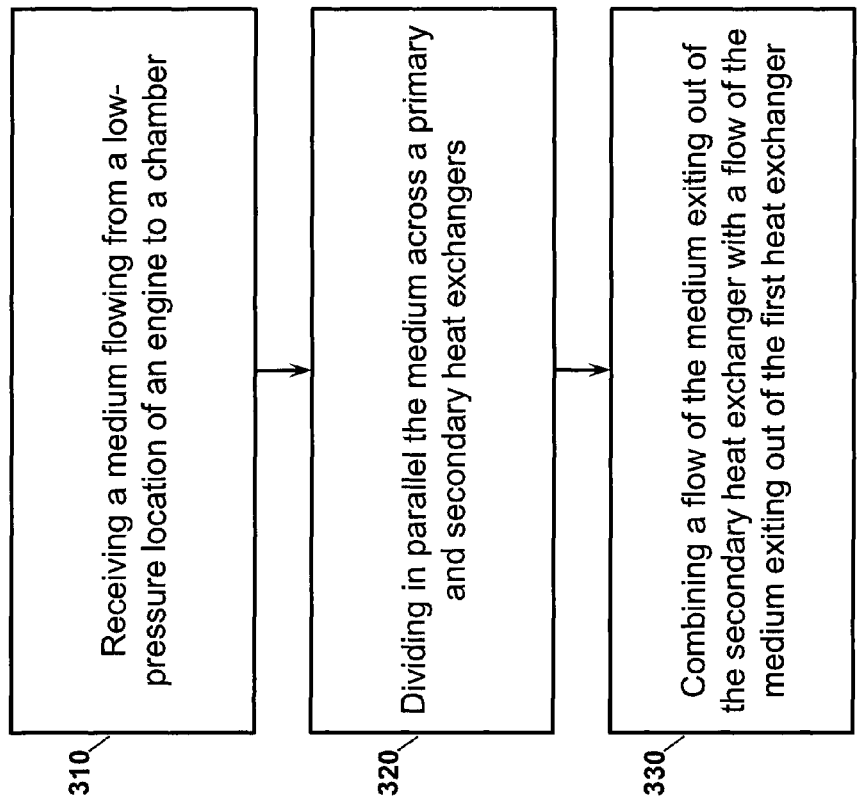
FIG. 3 is example of process flow an environmental control system according to an embodiment.

In another operation, a cooling mode operation may be performed by the environmental control system 200. The cooling mode operation will now be described with respect to FIG. 3. FIG. 3 illustrates a process flow 300 that begins at block 310 where the bleed air is accepted at inlet 101 from a low-pressure location of an engine of an aircraft at an initial flow rate, pressure (e.g., 13 psia), and temperature that is near a final flow rate, pressure, and temperature. Then, at block 320, due to the activation of the valves 105, 106, the bleed air is divided across both the primary heat exchanger 110 and the secondary heat exchanger 120 (e.g., in parallel), such that a first temperature of the bleed air at the valve 105 is collectively reduced to a second temperature that can be at or near a temperature of the chamber 102. That is, the environmental control system 200 can bypass the compressing device 130 by activating the valve 106 to divide a flow of the bleed from inlet 101 into the primary heat exchanger 110 and the secondary heat exchanger 120 (e.g., arrow A). Both heat exchangers, in turn, cool their respective portions of the bleed. Note that by dividing the bleed air in parallel across the heat exchangers 110, 120, which are very high loss components, reduces the pressure drop of the bleed air by half when compared to the one operation above where the bleed air flow flows in series across the heat exchangers 110, 120.

Then, at block 330, a flow of the bleed air exiting out of the secondary heat exchanger 120 is combined through the activation of valve 106 with a flow of the bleed exiting out of the primary heat exchanger 110 (e.g., arrow B). In general, the cooling mode operation may be called a heat exchanger cooling mode that lowers the temperature of the bleed air to a temperature required by the chamber. The cooling mode operation may be utilized when ram air cooling for the heat exchangers 110, 120 is adequate (e.g., ram air provides sufficient energy to the heat exchangers 110, 120 to reduce the temperature of the bleed air) and the pressure of the bleed air is high enough to maintain a pressure through the environmental control system 200 without the compressing device 130.

In view of the above parallel operation, another problem arises with respect to the ram air. That is, since the compressing device 130 is bypassed and nothing is controlling the compressing device 130, the ram air will cause the fan 248 to windmill. Windmilling is when the ram air (or any medium) causes the components of the compressing device 130 to freewheel, windmilling or freewheeling, thus, increases the depreciation or wear of the compressing device 130 and could destroy the compressing device 130. For example, ram air forcing the fan 248 to turn will cause the compressing device 130 to turn at any speed and variation (e.g., windmilling or freewheeling), thereby causing ball bearings, ceramic bearings, frictionless bearing, or the like of the compressing device 130 to grind. In turn, the following embodiments with respect to FIGS. 4-9 illustrate option for maintaining a minimum speed of the compressing device 130 or turning off the compressing device 130 such that the compressing device 130 does not windmill or freewheel.

Figure 4:
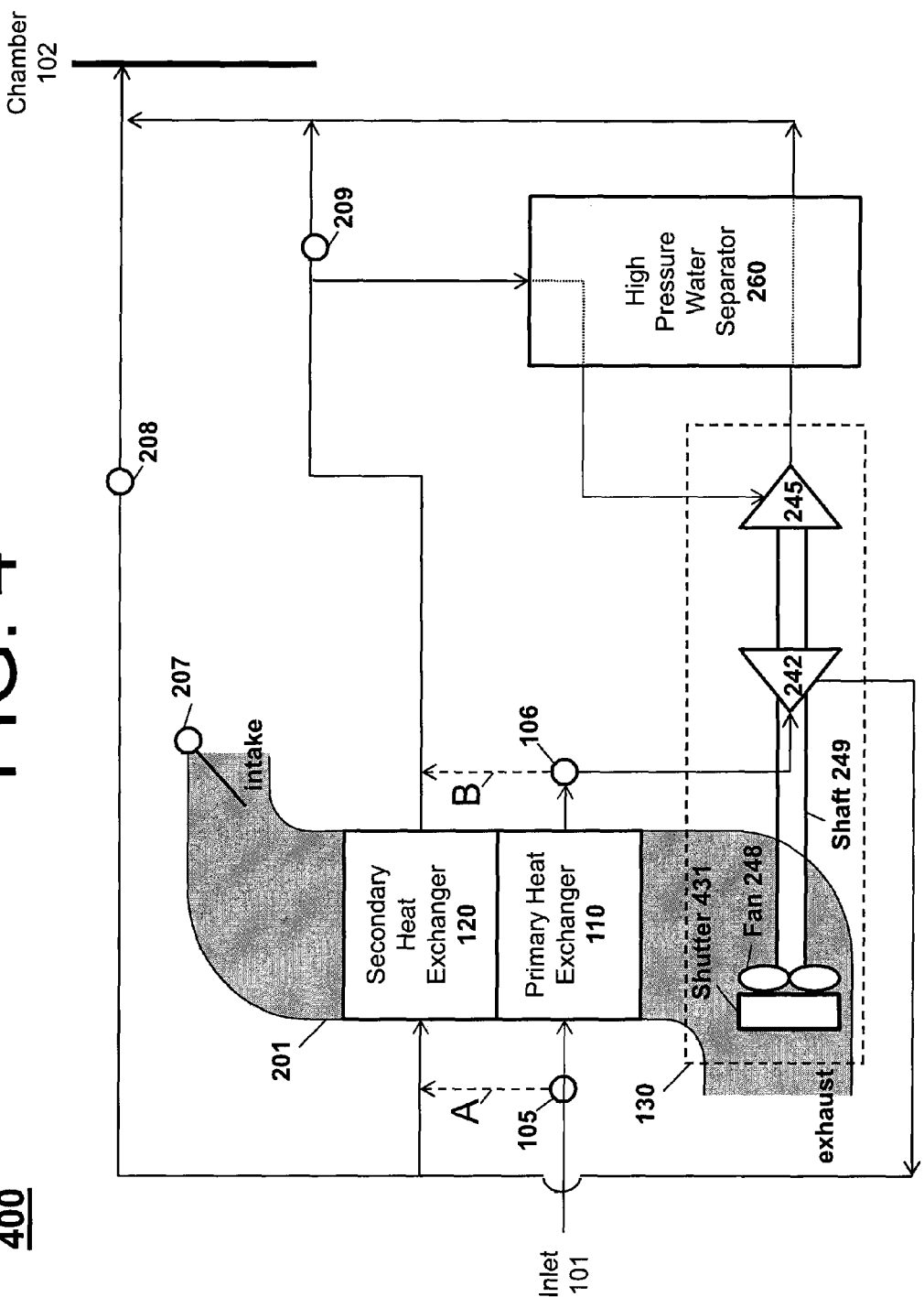
FIG. 4 is another operation example of an environmental control system according to an embodiment.

FIG. 4, according to an embodiment, illustrates an environmental control system 400 (e.g., an embodiment of system 100) that adds a mechanical device to block a ram air flow from going through and turning the fan 248 or stop the shaft 249 of the compressing device 130 from turning. For example, the environmental control system 400 includes, in additional to the previously described items of FIG. 2, as this mechanical device, a shutter 431. The shutter 431 is a mechanism that, when engaged, closes a path of the ram air over the fan 248 such that the ram air will not cause windmilling of the compressing device 130 (e.g., prevent the flow of ram air through the compressing device 130, as windmilling will not occur without this flow). In another embodiment, the mechanical device can be implemented as a brake that stops the shaft 249 from spinning despite the path of the ram air over the fan 248 remaining open (e.g., the brake seizes any portion of the compressing device 130 to prevent rotation). Further, an embodiment can include a bypass channel, which may be of a fixed or variable dimension, around the compressing device 130. The bypass channel, in general, can be proportionally greater than an intake of the compressing device 130 so that when the compressing device 130 is not operational (e.g., bypassed by the parallel cooling described above) the ram air flows through the bypass channel and not through the compressing device 130. In addition, an embodiment can include any combination of the shutter 431, the brake, and the bypass channel.

Figure 5:
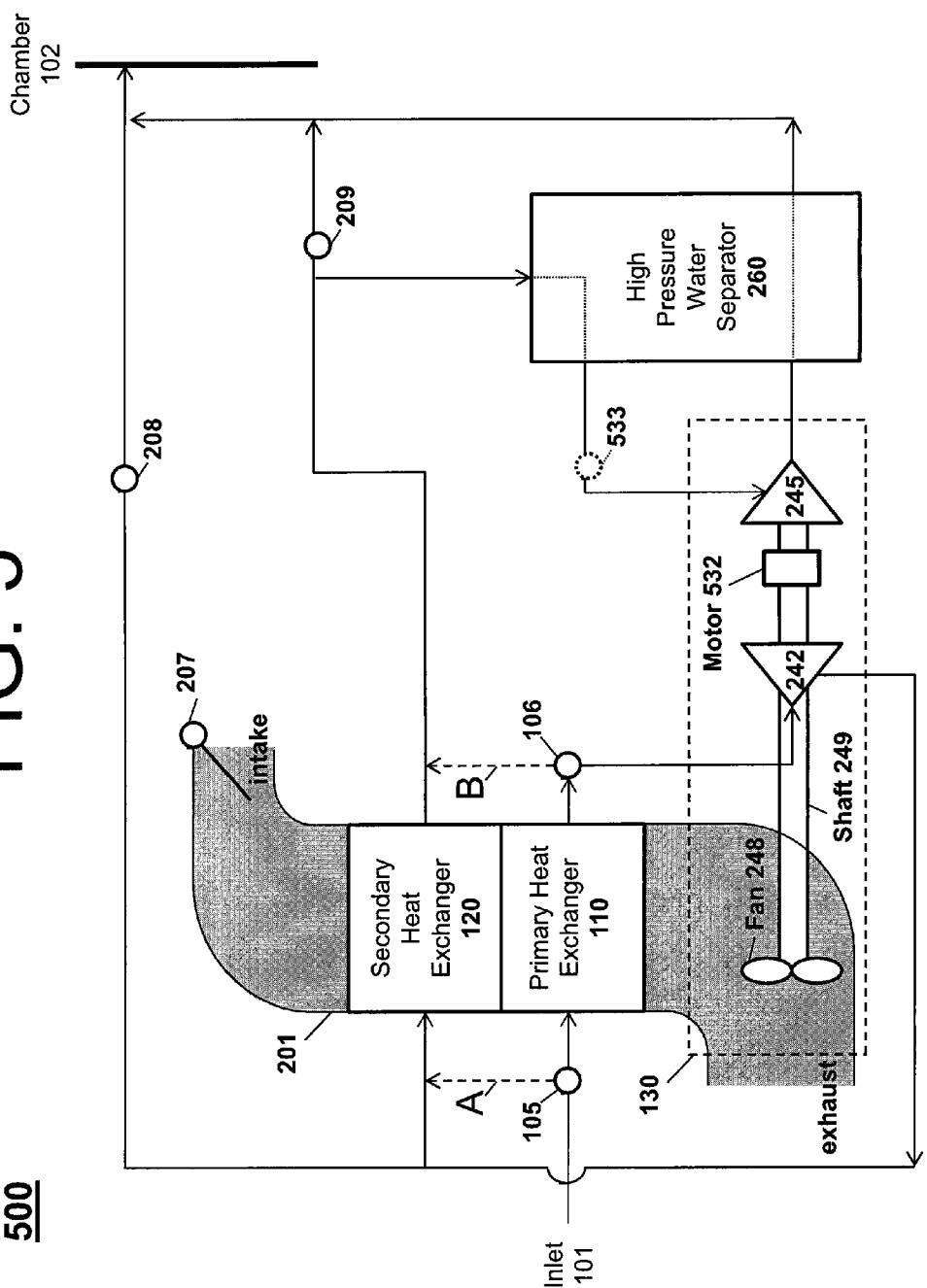
FIG. 5 is another operation example of an environmental control system according to an embodiment.

FIG. 5, according to an embodiment, illustrates an environmental control system 500 (e.g., an embodiment of system 100) that controls the speed of the shaft 249 of the compressing device 130. The environmental control system 500 includes, in additional to the previously described items of FIG. 2, a motor 532 and optionally a valve 533 (as illustrated by the dotted lines). The motor 532 can supply additional power to keep the shaft 249 spinning at the same or greater revolutions per minute than that which would be caused by the ram air. For example, continuing with the aircraft example above, when the aircraft is at cruise the revolutions per minute of the motor 532 can be 3,000, 3,500, 4,000, 4,500, 5,000, 5,500, 6,000, etc. or greater, so that the compressing device 130 actively turns faster than windmilling or freewheeling. The motor 532 may be any mechanical device powered by any energy source to provide the supply of additional power (e.g., an electric motor operating of a battery or other electric source, a hydraulic motor, etc.). In another embodiment, the environmental control system 500 can include another valve 533 between the high pressure water separator 260 and the turbine 245, such that a parallel flow path of bleed air is created through the turbine 245 that provides enough power or energy to the turbine to keep the compressing device 130 turning. This valve 533 may also work in conjunction with dumping this bleed air of the parallel flow path overboard (e.g., outside the environmental control system 500), which is further described below with respect to FIGS. 6-9. In addition, an embodiment can include any combination of the shutter 431, the brake, the bypass channel, the valve 533 causing parallel flow path, and the dumping of bleed air overboard.

Figure 6:
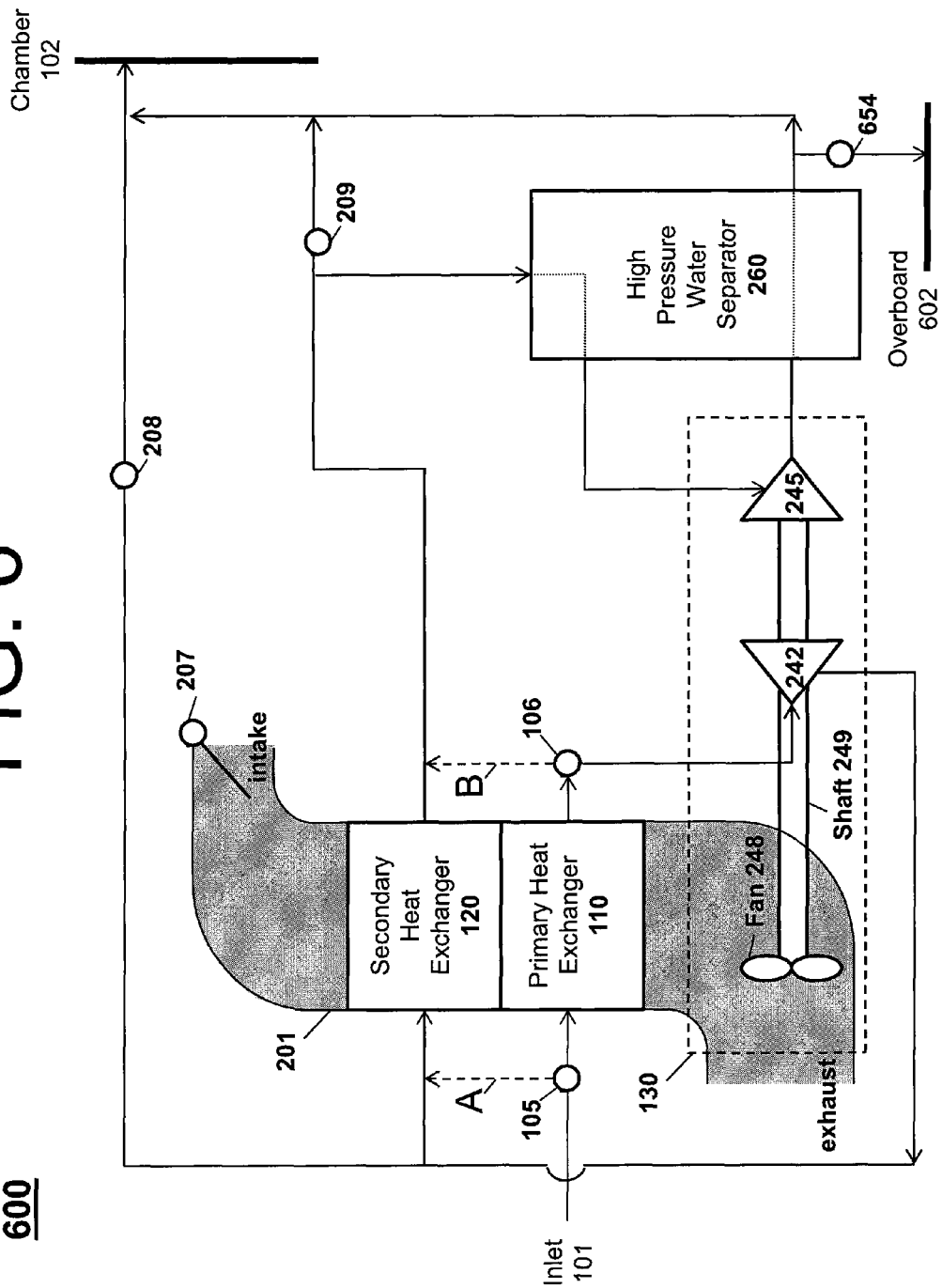
FIG. 6 is another operation example of an environmental control system according to an embodiment.

FIG. 6, according to an embodiment, illustrates an environmental control system 600 (e.g., an embodiment of system 100) that uses the air bleed to turn an existing turbine 245 of the compressing device 130. That is, the environmental control system 600 includes, in additional to the previously described items of FIG. 2, a valve 654 that sends the bleed air over board 602, which in turn draws the air bleed through the turbine 245 of the compressing device 130. For example, continuing with the aircraft example above, when the aircraft is at cruise the ambient pressure outside the aircraft can be 3 psia. With the pressure of the bleed air being near the chamber pressure (e.g., 13 psia), a pressure ratio is created (e.g., X:Y, where X is the pressure of the bleed air and Y is the ambient pressure) across the turbine 245 based on the activation of the valve 654. This pressure ratio, which can be 13:3, forces the bleed air through the compressing device 130. In this way, any amount of revolutions per minute may be maintained by the environmental control system 600 (e.g., 6,000 revolutions per minute or greater), so that the compressing device 130 actively turns faster than windmilling or freewheeling.

Figure 7:
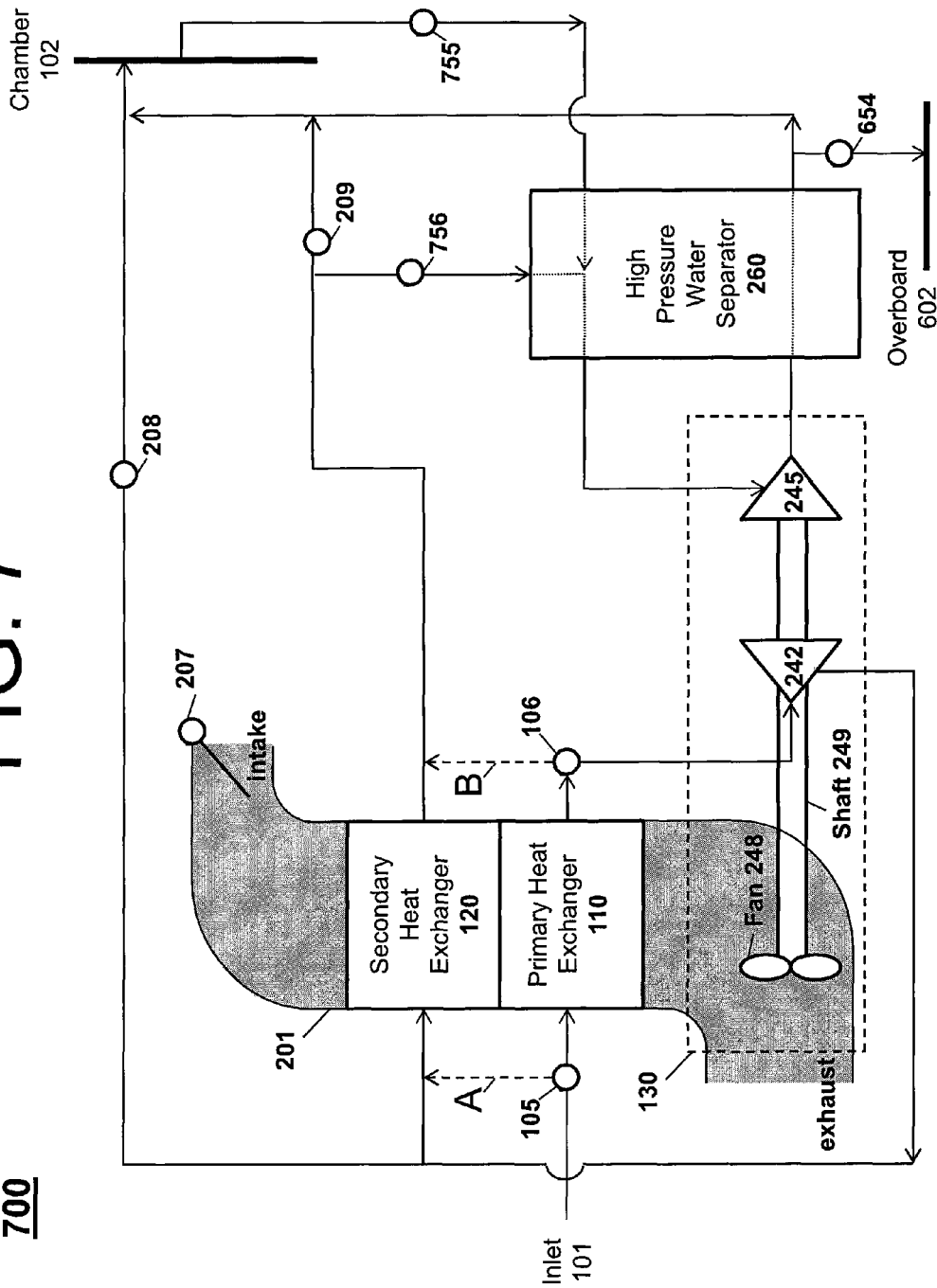
FIG. 7 is another operation example of an environmental control system according to an embodiment.

In another embodiment, as shown in an environmental control system 700 (e.g., an embodiment of system 100) of FIG. 7, the chamber pressure may be utilized to create the pressure ratio. The environmental control system 700 includes, in additional to the previously described items of FIG. 6, valve 755, 756 that sends the air from the chamber 102 through the turbine 245 of the compressing device 130 over board 602. That is, based on the activation of the valves 654, 755, 756, a pressure ratio is created (e.g., Z:Y, where Z is the chamber pressure of the air from the chamber 102 and Y is the ambient pressure) across the turbine 245. Thus, when the chamber pressure is 12 psia and the ambient pressure is 3 psia, the pressure ratio is 4:1.

Figure 8:
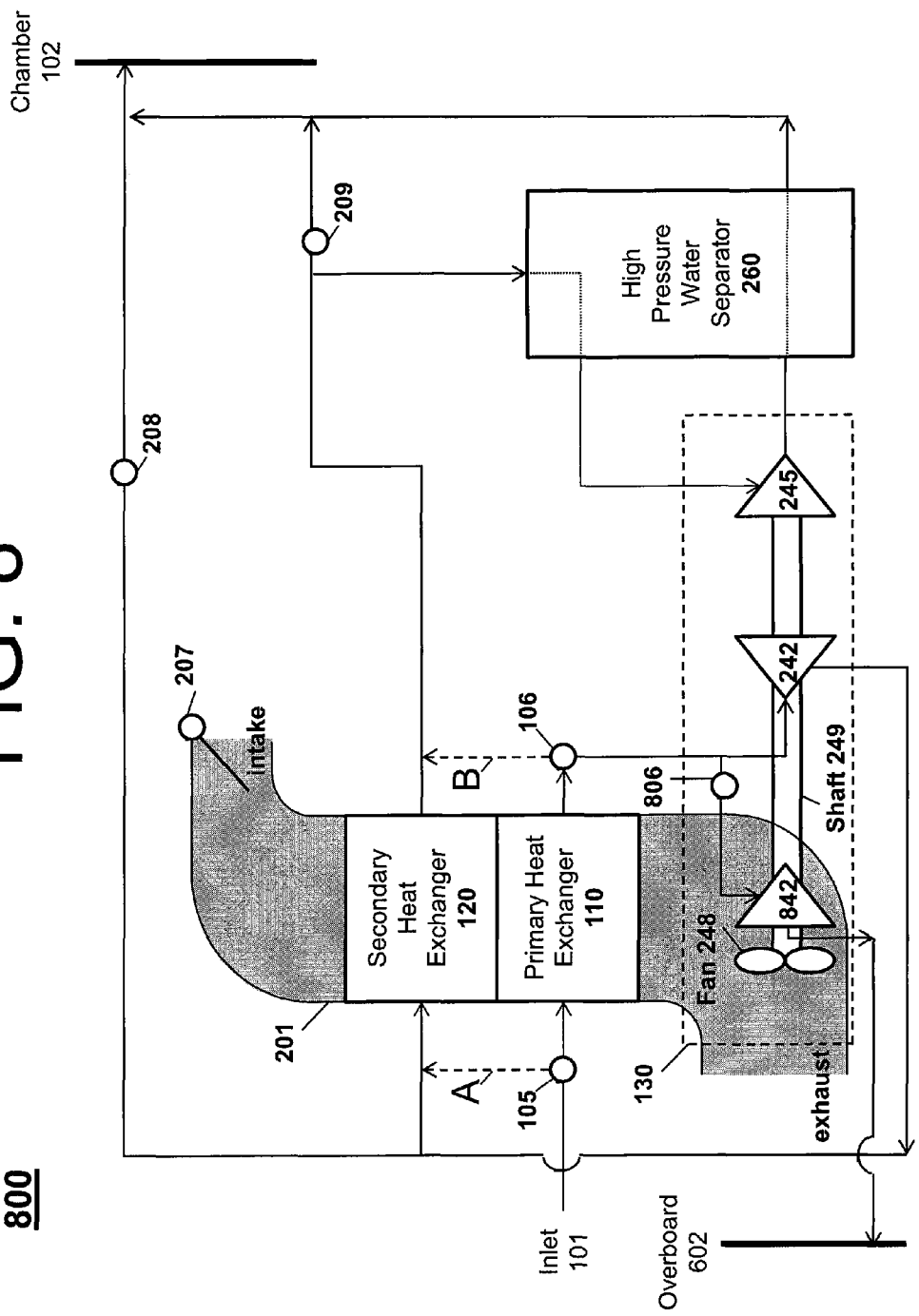
FIG. 8 is another operation example of an environmental control system according to an embodiment.
Figure 9:
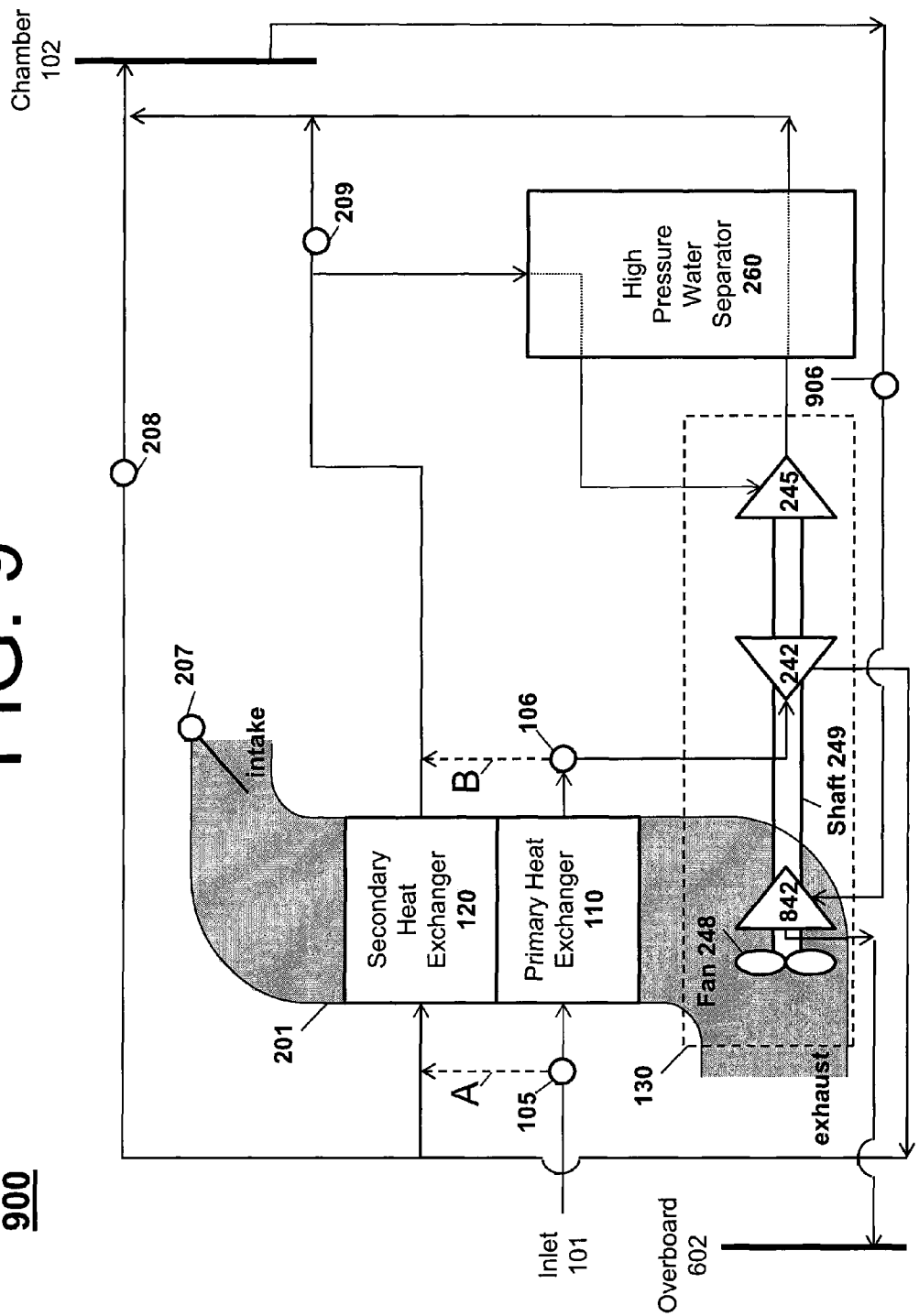
FIG. 9 is another operation example of an environmental control system according to an embodiment.

FIGS. 8-9, according to other embodiments, illustrate environmental control systems 800, 900 (e.g., an embodiment of system 100) that include valves 806, 906 and the turbine 842. The systems 800, 900 utilize alternative sources of air to turn a turbine 842 of the compressing device 130 based on a pressure ratio between the source and the ambient pressure of the air that is overboard 602. For example, the environmental control systems 800 utilizes the bleed air exiting from the primary heat exchanger 110 (e.g., source) and regulated by the valve 806 to turn the compressing device 130 in accordance with a pressure ratio across the turbine 842. Further, the environmental control systems 900 utilizes the bleed air exiting from the chamber 102 (e.g., source) and regulated by the valve 906 to turn the compressing device 130 in accordance with a pressure ratio across the turbine 842. In addition, an embodiment can include any combination of mechanisms as described above (e.g., the shutter 431, the brake, the bypass channel, the valve 533 causing parallel flow path, the dumping of bleed air overboard, and creating a pressure ratio from any source across the turbine 245 and/or turbine 842) such that the compressing device 130 does not windmill or freewheel.

Aspects of the present invention are described herein with reference to flowchart illustrations, schematics, and/or block diagrams of methods, apparatus, and/or systems according to embodiments of the invention. Further, the descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A system, comprising:
   a medium flowing from a low-pressure location of an engine to a chamber;
   a plurality of heat exchangers configured to provide parallel cooling by receiving the medium in parallel across at least a first heat exchanger and a second heat exchanger of the plurality of heat exchangers; and
   a compressing device, in communication with the plurality of heat exchangers, configured to be bypassed during the parallel cooling; and
   a mechanism for preventing the compressing device from windmilling during the parallel cooling,
   wherein a pressure of the medium at the low-pressure location of an engine is slightly above a chamber pressure.

2. The system of claim 1, wherein ram air cooling provides sufficient energy to the plurality of heat exchangers to reduce a temperature of the medium from a first temperature to a second temperature.

3. The system of claim 1, wherein the mechanism prevents the compressing device from windmilling during the parallel cooling by stopping a shaft of the compressing device from spinning.

4. The system of claim 3, wherein the mechanism is a shutter that prevents the flow of ram air through the compressing device.

5. The system of claim 3, wherein the mechanism is a brake that seizes any portion of the compressing device to prevent rotation.

6. The system of claim 3, wherein the mechanism is a bypass channel around the compressing device that is greater than an intake of the compressing device.

7. The system of claim 1, wherein the mechanism is a source that actively causes the compressing device to turn faster than the windmilling.

8. The system of claim 7, wherein the source is a motor configured to supply additional power to a shaft of the compressing device, and
   wherein the additional power causes the shaft of the compressing device to spin at a same or greater rate than a rate caused by the windmilling.

9. The system of claim 7, wherein the source is a pressure ratio across a turbine of the compressing device.

10. The system of claim 9, wherein the pressure ratio is between a pressure of the medium and an ambient pressure outside the system.

11. The system of claim 9, wherein the pressure ratio is between a chamber pressure and an ambient pressure outside the system.

12. The system of claim 9, wherein the pressure ratio is created by a parallel flow path to the turbine of the compressing device.

13. The system of claim 1, wherein the system is an environmental control system of an aircraft,
    wherein the medium is air bled from an engine of the aircraft, and
    wherein the chamber is a cabin of the aircraft.

14. The system of claim 1, wherein the compressing device is an air cycle machine.

* * * * *